United States Patent [19]

Putman et al.

[11] 3,959,193

[45] May 25, 1976

[54] UTILIZATION OF CELLULOSE ACETATE BUTYRATE AND ARYL SULFONAMIDE-FORMALDEHYDE RESIN CONTAINING DISPERSANT

[75] Inventors: Edgar N. Putman, New Hope; George Patterson, Philadelphia; Scotty Wimer, Bethlehem; John B. McCool, 3rd, Ottsville, all of Pa.

[73] Assignee: PFD/Penn Color, Inc., Doylestown, Pa.

[22] Filed: Mar. 12, 1973

[21] Appl. No.: 340,453

[52] U.S. Cl. .............................. 260/15; 106/193 J; 106/193 P; 106/308 C; 106/308 M; 106/308 N; 252/314; 252/353; 252/354; 252/355; 252/363.5; 260/42.54; 260/42.57
[51] Int. Cl.² .......................................... C08L 1/14
[58] Field of Search ........ 252/353, 354, 355, 363.5; 106/308 C, 308 N, 308 M, 193 J, 193 P; 260/15

[56] References Cited
UNITED STATES PATENTS

| | | | |
|---|---|---|---|
| 2,545,174 | 3/1951 | Sido | 260/30.8 R X |
| 2,649,382 | 8/1953 | Vesce | 106/193 J |
| 3,706,708 | 12/1972 | Kearnan et al. | 252/363.5 X |
| 3,712,824 | 1/1973 | Kiyokawa et al. | 106/308 M |

*Primary Examiner*—Richard D. Lovering
*Attorney, Agent, or Firm*—Frank J. Benasutti; Philip S. Johnson

[57] ABSTRACT

A combination of an aryl sulfonamide-formaldehyde resin and film forming material, such as cellulose acetate butyrate, which may further include a surfactant, such as a non-ionic surfactant including, for example, an alkylarylpolyether, comprises a "universal" dispersant for resin additives, such as pigment materials. This composition generally includes 40 – 90 weight % of any of various types of additives, including pigments. The dispersant generally comprises from 30 – 80 weight % film former or binder, which may consist of cellulose acetate butyrate or a solid plasticizer, such as camphor, sucrose benzoate and dicyclohexylphthalate, and from 20 – 70 weight % of the aryl sulfonamide-formaldehyde resin. Apart from pigments, the additives may consist of fillers, extenders, etc., including, for example, calcium carbonate, antimony oxide and magnesium silicate.

4 Claims, No Drawings

UTILIZATION OF CELLULOSE ACETATE BUTYRATE AND ARYL SULFONAMIDE-FORMALDEHYDE RESIN CONTAINING DISPERSANT

This invention pertains to resin additive compositions and more particularly to such compositions of a single general type including any known type of additive and adapted to be included in and compatible with many common resin systems.

As used herein, the term "resin additive" refers to a finely divided particulate material which is generally insolvent in most solvent systems and which is generally used to impart color (in the case of pigments), fire resistance (antimony oxide), lubricity (talc) and other similar properties to resinous materials which are thereafter formed into a final product such as a molding, a film, etc.

The artisan may select from a wide variety of such additives, depending on the application, the properties required, the compatibility of the additive with the environment in which it will be used, including, for example, exposure to heat, cold or reactive atmosphere, etc.

Similarly an immense variety of resins are also available. Compatibility between the additive and resin must therefore be considered. While few additives are chemically incompatible with any given resin system, it is generally difficult to disperse most typical solid particulate additives in most resin systems because of the generally inherent insolubility of such additives in most resin systems.

This problem has been solved conventionally by first dispersing or suspending the additive material in a dispersant composition which is soluble in or compatible with a given resin system.

Difficulty has been encountered in the prior art, however, in selecting a dispersant composition which effectively disperses a chosen additive and which is sufficiently compatible with, or preferably soluble in, a chosen resin system.

Ideally, a single dispersant composition should be sufficiently compatible with all known classes of additives and resin systems to facilitate the dispersion of any additive in any resin. Heretofore, no such single dispersion composition has been known.

It is therefore the general object of the present invention to provide such a single, as nearly as possible, universal dispersant composition and to provide an additive composition based on such universal dispersant composition, which will effectively disperse substantially any generally insoluble particulate additive in many common resin systems.

This, and other more detailed objectives which will become apparent in the course of the subsequent discussion, are met by a dispersant composition consisting essentially of 30 – 80 weight % film forming material, such as cellulose acetate butyrate or a solid plasticizer, such as camphor, sucrose benzoate and dicyclohexylphthalate, and 20 – 70 weight % of an aryl sulfonamide-formaldehyde resin. The present invention also encompasses a composition consisting essentially of from 40 – 90 weight % of a particulate additive material, the remainder of the composition consisting of the above-described universal dispersant.

In its preferred embodiment, this invention consists of a composition loaded with from 55 – 65 weight % pigment, the remainder consisting of 40 – 70 weight % aryl sulfonamide-formaldehyde resin and 30 – 70 weight % cellulose acetate butyrate. Preferably also, the resin is colorless and has a softening point between 60° – 70°C and the cellulose acetate butyrate has a butyrate content, in weight %, of from 17 – 65 and a falling ball viscosity, based on standard ASTM tests, of from ½ – 40 seconds.

In a particular embodiment of this invention, a surfactant, such as a non-ionic surfactant including, for example an alkylarylpolyether, is included in the universal dispersant composition prior to its combination with the pigment to be dispersed. The surfactant assists in the scavenging of residual water in the pigment filter press cake, which is at times the form in which pigment is received and mixed with the universal dispersant of the present invention.

For a better understanding of this invention, reference is made to the detailed discussion thereof which follows, taken in conjunction with the subjoined claims.

Generally, pigments are either organic or inorganic compounds which impart color to a resin system by virtue of their dispersion therein but which are chemically non-reactive with the resin system. The organic compounds include several classes, to wit: the indanthrone compounds, the beta-oxy-naphthoic acid compounds, and the phthalocyanine compounds. Pigments within these classes include specifically derivatives of the generic compounds and most specifically metal derivatives thereof. The inorganic pigment compounds include cadmium sulfide, cadmium sulfide-selenide, iron oxide, elemental carbon, titanium dioxide, and chromates, molybdates, sulfates, carbonates and oxides of lead.

Based upon the dispersibility characteristics of pigments of the foregoing types and within the foregoing classes either known from past tests or predicted on the basis of chemical structures and chemical similarities, and with a view also to the pigment and pigment classes of most significant commercial interests, numerous pigments have been selected for testing to insure their compatibility with and dispersibility in the universal dispersant, and pigment compositions based thereon, of the present invention. The pigments which have been successfully tested include:

|  | C.I. No. | C.I. Name |
|---|---|---|
| Red Lake "C" | 15585 | Red 53 |
| BON Red | 15860 | Red 52 |
| Lithol Rubine | 15850 | Red 57 |
| Pigment Scarlet | 16105 | Red 60 |
| Quinacridone | 46500 | Violet 19 |
| Red 2B | 15865 | Red 48 |
| Phthalocyanine Blue | 74160 | Blue 15 |
| Phthalocyanine Green | 74260 | Green 7 |
| Diarylide Yellow (AAA) | 21090 | Yellow 12 |
| Diarylide Yellow (AAOT) | 21095 | Yellow 14 |
| Diarylide Yellow (AAMX) | 21100 | Yellow 13 |
| Disazo Yellow | n/a | Yellow 83 |
| Carbon Black |  |  |
| Titanium Dioxide |  |  |
| Chrome Yellow |  |  |

Other typical resin additives which may be dispersed in the dispersant of this invention include calcium carbonate, clay, antimony oxide, talc, barium sulfate, activated silica, magnesium silicate and other similar fillers, extenders, and property modifiers.

Based on laboratory tests, and some pilot plant or plant scale development tests, the universal dispersant systems of the present invention have been found to be compatible with and dispersible (including in most cases soluble) in the following types of resin systems:

Nitrocellulose (both regular and spirit soluble and of all known viscosities)

Polyvinyl chloride and vinylacetate copolymers thereof (including 8 – 16% acetate)

"Thermoplastic rubber", a polyolefin-based material, manufactured by Uniroyal Corporation.

Thermoplastic, ketone soluble acrylics

Ketone or acetate soluble polyurethanes and polyesters

Polyolefins, including particularly high density polyethylene

Solution grades of polyamides, such as Versamid 960, a product of General Mills and Butyl Benzyl Phthalate, a plasticizer commonly added to plastisols.

Thus, it is clear that the universal dispersant of the present invention, and particularly the additive compositions based on this universal dispersant composition, provide an effective means to disperse practically all known pigments and many other additives in many commercially significant resin systems.

The universal dispersant of the present invention consists basically of from 30 – 80 weight % film forming material, such as cellulose acetate butyrate or a solid plasticizer, such as camphor, sucrose benzoate and dicyclohexylphthalate, with a maximum of 70 weight % preferred, and from 20 – 70 weight % of an aryl sulfonamide-formaldehyde resin with a mimimum of 30% preferred.

Cellulose acetate butyrate, the preferred (for most purposes) film forming constituent of the dispersant of the present invention, is a well-known compound. As commercially available from Eastman-Kodak Company, this material may include from 17 – 65 weight % butyrate (or more accurately butyryl substituent). The number of hydroxyl groups in the compound per four anhydroglucose units may vary from less than 1 to slightly above 2 and the falling ball viscosity of the compound may vary from less than ½ to 40 seconds as tested by A.S.T.M. method D-1343-54T in the solution described as Formula A of A.S.T.M. method D-871-54T. Cellulose acetate butyrate of various types throughout these ranges of properties have been found to be useful in the compositions of the present invention.

Aryl sulfonamide-formaldehyde resins are common resins of commerce, normally available from the Organic Chemical Division of the Monsanto Chemical Company, 800 N. Lindbergh Blvd. Saint Louis, Missouri, under the trade names "Santolite MHP" and "Santolite MS." Preferably the resin is colorless and has a softening point between 60° – 70°C. Such resins and methods for making same are thought to be disclosed in U.S. Pat. No. 2,545,174— Sido.

Because some pigment and other types of additive materials are received in cake form from a filtering process, they include a certain amount of residual water. Therefore, in some cases it is desirable to include a surfactant to prevent the water from interfering in the dispersion process. In order that the surfactant does not in turn cause a compatibility problem with a resin in which the additive is ultimately dispersed together with the universal dispersant composition of the present invention, it is preferred that such a surfactant be a non-ionic surfactant such as an alkylarylpolyether having the following general structural formula:

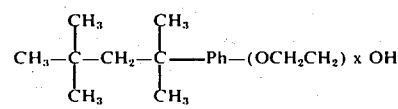

wherein Ph is phenyl and $x$ is a numerical average having a value of from 1 to 70.

Such a product may be produced, for example, by the reaction of octyl phenol with ethylene oxide.

Generally, the resin additive compositions of this invention are produced in conventional equipment such as a 150 gallon vaccum-equipped Baker Perkins heavy-duty dispersion blade mixer and a standard plastics granulater. The additive, in whatever form received, such as pigment filter press cake is simply added to the universal dispersant and combined therewith in such a conventional mixer. In such equipment, a plant scale test production run has been made utilizing benzidine yellow organic press cake pigment (in a concentration of 65 weight %) within a resin blend, comprising 30 weight % cellulose acetate butyrate and 70 weight % "Santolite M.H.P." aryl sulfonamide-formaldehyde resin, as the dispersant. A smooth, readily dispersible, dispersed pigment composition was formed.

In other examples of this invention, a variety of additives, including pigments, and dispersant compositions, at various concentrations, have been utilized and tested for compatibility in typical resin systems. Several such examples are listed in the Table which follows.

TABLE

| Additive Description | Wt% Additive | Surfactant, if any (and wt%) | DISPERSANT Wt% Aryl sulfonamide wt% in dispersant | film former and wt% thereof in dispersant | Resin Systems in which dispersibility demonstrated |
|---|---|---|---|---|---|
| PCN Blue | 75 | — | 25 | 60 | 40 (CAB)* | nitrocellulose, polyvinyl chloride, polyvinyl chloride-polyvinyl acetate, acrylic |
| PCN Blue | 70 | — | 30 | 67 | 33 (CAB)* | nitrocellulose, polyvinyl chloride, polyvinyl chloride-polyvinyl acetate, polyamid |
| Benzidine Yellow | 65 | — | 35 | 71.5 | 28.5 (CAB)* | nitrocellulose, polyvinyl chloride, polyvinyl chloride-polyvinyl acetate, thermoplastic rubber |
| Carbon Black | 55 | Triton X-100 (1%) | 45 | 45 | 55 (CAB)* | nitrocellulose, polyvinyl chloride, polyvinyl chloride-polyvinyl acetate, polyolefin |
| BON Red | 60 | — | 40 | 70 | 30 (CAB)* | nitrocellulose, polyvinyl chloride, polyvinyl chloride-polyvinyl acetate |
| Quinacridone | 60 | — | 40 | 60 | 40 (CAB)* | nitrocellulose, polyvinyl chloride, |

TABLE-continued

| Additive Description | Wt% Additive | Surfactant, if any (and wt%) | DISPERSANT Wt% | Aryl sulfonamide wt% in dispersant | film former and wt% thereof in dispersant | Resin Systems in which dispersibility demonstrated |
|---|---|---|---|---|---|---|
| Violet Disazo Yellow | 65 | — | 35 | 55 | 45 (CAB)* | polyvinyl chloride-polyvinyl acetate, nitrocellulose, polyvinyl chloride, polyvinyl chloride-polyvinyl acetate, butyl benzl phthalate |
| Perylene Scarlet | 45 | — | 55 | 30 | 70 (CAB)* | nitrocellulose, polyvinyl chloride, polyvinyl chloride-polyvinyl acetate |
| Chrome Yellow | 80 | — | 20 | 50 | 50 (CAB)* | nitrocellulose, polyvinyl chloride, polyvinyl chloride-polyvinyl acetate, urethane |
| Titanium Dioxide | 85 | — | 15 | 65 | 35 (CAB)* | nitrocellulose, polyvinyl chloride, polyvinyl chloride-polyvinyl acetate, polyester |
| Bentone 27 | 75 | — | 25 | 60 | 40 (Camphor) | nitrocellulose, polyvinyl chloride, polyvinyl chloride-polyvinyl acetate |
| Bentone 38 | 80 | — | 20 | 40 | 60 (Camphor) | nitrocellulose, polyvinyl chloride, polyvinyl chloride-polyvinyl acetate |
| Chrome Yellow | 85 | Triton X-100 (1%) | 15 | 50 | 50 (Sucrose Benzoate) | nitrocellulose, polyvinyl chloride, polyvinyl chloride-polyvinyl acetate |

*Cellulose acetate butyrate

While this invention has been described with respect to particular embodiments thereof, it should be understood that various other embodiments would be apparent to those skilled in the art, which other embodiments may also be within the true spirit and scope of the present invention. It is intended that the following claims be construed to encompass all such alternative embodiments of this invention.

We claim:

1. A method of utilizing a cellulose acetate butyrate containing dispersant composition to disperse a resin additive into a given resin system, comprising the steps of:
   a. providing a given weight of resin additive dispersant composition consisting essentially of cellulose acetate butyrate, aryl sulfonamide-formaldehyde resin, and a non-ionic surfactant, said surfactant comprising up to 1%, by weight, of said composition, the remainder of said composition comprising:
      i. said cellulose acetate butyrate, and
      ii. said aryl sulfonamide-formaldehyde resin in a weight ratio range (ratios of (i) to (ii)) from 80:20 to 30:70;
   b. mixing said resin additive into said resin additive dispersant composition in a ratio of from ⅔ to 9 times said given weight of resin additive dispersant composition, to produce a dispersed resin additive composition; and
   c. dispersing the dispersed resin additive composition in a given resin system selected from the group consisting of solution grades of polyvinylchloride, polyvinylacetate, polyvinylchloride copolymer, polyvinylacetate copolymer, thermoplastic rubber, polyurethanes, polyolefins, and solution grades of polyamides.

2. The method of claim 1 wherein said resin additive is a pigment.

3. The method of claim 2 wherein said pigment is a finely divided particulate material selected from the group consisting of benzidine compounds, indanthrone compounds, beta-oxy-naphthoic acid compounds, phthalocyanine compounds, cadmium sulfide, cadmium sulfide-selenide, iron oxide, elemental carbon, antimony trioxide, titanium dioxide, and chromates, molybdates, sulfates, carbonates and oxides of lead.

4. A method of utilizing the cellulose acetate butyrate containing dispersant composition to disperse a resin additive into a given resin system comprising the steps of:
   a. providing a given weight of resin additive dispersant composition consisting essentially of cellulose acetate butyrate, aryl sulfonamide-formaldehyde resin, and a non-ionic surfactant, said surfactant comprising up to 1%, by weight, of said composition, the remainder of said composition comprising:
      i. said cellulose acetate butyrate, having a butyrate content, in weight percent of from 17 to 65 and a falling ball viscosity, as measured by ASTM Method D-1343-54T in a solution of formula A of ASTM Method D-871-54T of from ½ to 40 seconds, and
      ii. said aryl sulfonamide-formaldehyde resin in a weight ratio range (ratios of (i) to (ii)) from 80:20 to 30:70;
   b. mixing said resin additive into resin additive dispersant composition in a ratio of from ⅔ to 9 times said given weight of said resin additive dispersant composition, to produce a dispersed resin additive composition; and
   c. dispersing the dispersed resin additive composition in a given resin system selected from the group consisting of polyvinylchloride, polyvinylacetate, polyvinylchloride copolymer, polyvinylacetate copolymer, thermoplastic rubber, polyurethanes, polyolefins, solution grades of polyamids, and thermoplastic ketone soluble acrylics.

* * * * *